United States Patent [19]
Orem

[11] 4,420,891
[45] Dec. 20, 1983

[54] FRAMING AND LAYOUT SQUARE

[75] Inventor: Howard L. Orem, Petrolia, Calif.

[73] Assignee: Richard B. Cogswell, Hinsdale, Ill.

[21] Appl. No.: 290,351

[22] Filed: Aug. 5, 1981

[51] Int. Cl.³ .............................................. B43L 7/00
[52] U.S. Cl. ..................................................... 33/476
[58] Field of Search ................. 33/476, 479, 480, 474, 33/419, 403, 421–424, 429, 1 N

[56] References Cited

U.S. PATENT DOCUMENTS

| 189,311 | 4/1977 | Klinglesmith | 33/421 |
| 327,283 | 9/1885 | Levy | 33/421 |
| 558,117 | 4/1896 | Spaulding | 33/420 |
| 563,465 | 7/1896 | Farley | 33/476 |
| 846,274 | 3/1907 | Yates | 33/476 |
| 1,176,026 | 3/1916 | Boone | 33/476 |
| 1,196,519 | 8/1916 | Caylor | 33/476 |
| 1,660,624 | 2/1928 | Musham | 33/476 |
| 1,708,551 | 4/1929 | Nell | 33/476 |

FOREIGN PATENT DOCUMENTS

| 35230 | 7/1975 | Australia | 33/480 |
| 164239 | 10/1949 | Austria | 33/480 |
| 494991 | 1/1954 | Italy | 33/419 |
| 10374 | of 1906 | United Kingdom | 33/419 |
| 532738 | 1/1941 | United Kingdom | 33/480 |

Primary Examiner—Harry N. Haroian
Attorney, Agent, or Firm—McWilliams, Mann, Zummer and Sweeney

[57] ABSTRACT

A framing and layout square of flat unitary construction is provided exhibiting a number of unique and innovative features. The square includes an elongated blade, an elongated slot defined in the blade and parallel to the edges of the blade to provide two additional edges for the marking of measurement scales, a tongue joined at a right angle to the blade and provided with a terminal edge set at a forty-five degree angle to the tongue's lateral edges and adapted to provide a pivot point for the measurement of angles.

9 Claims, 6 Drawing Figures

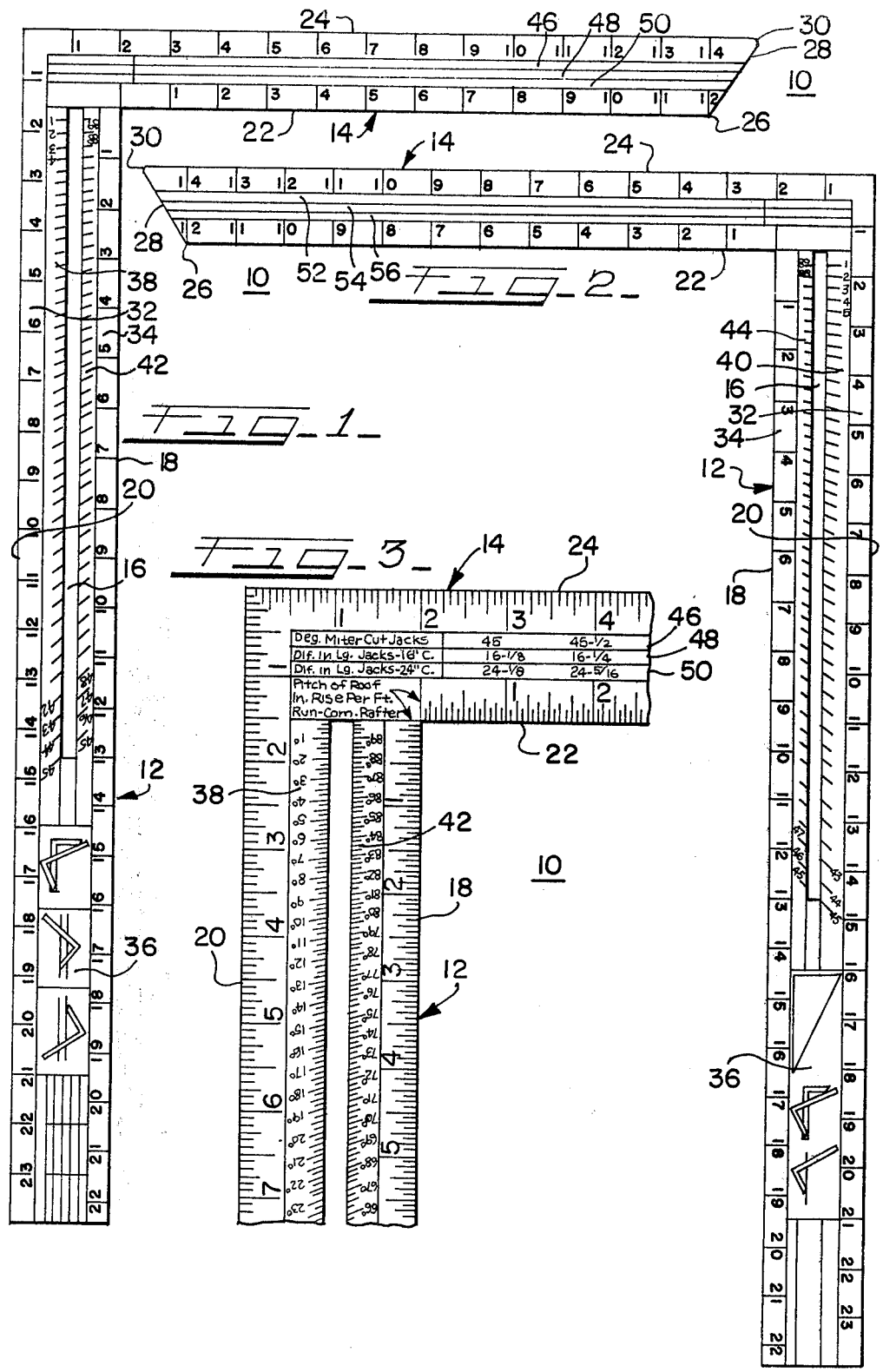

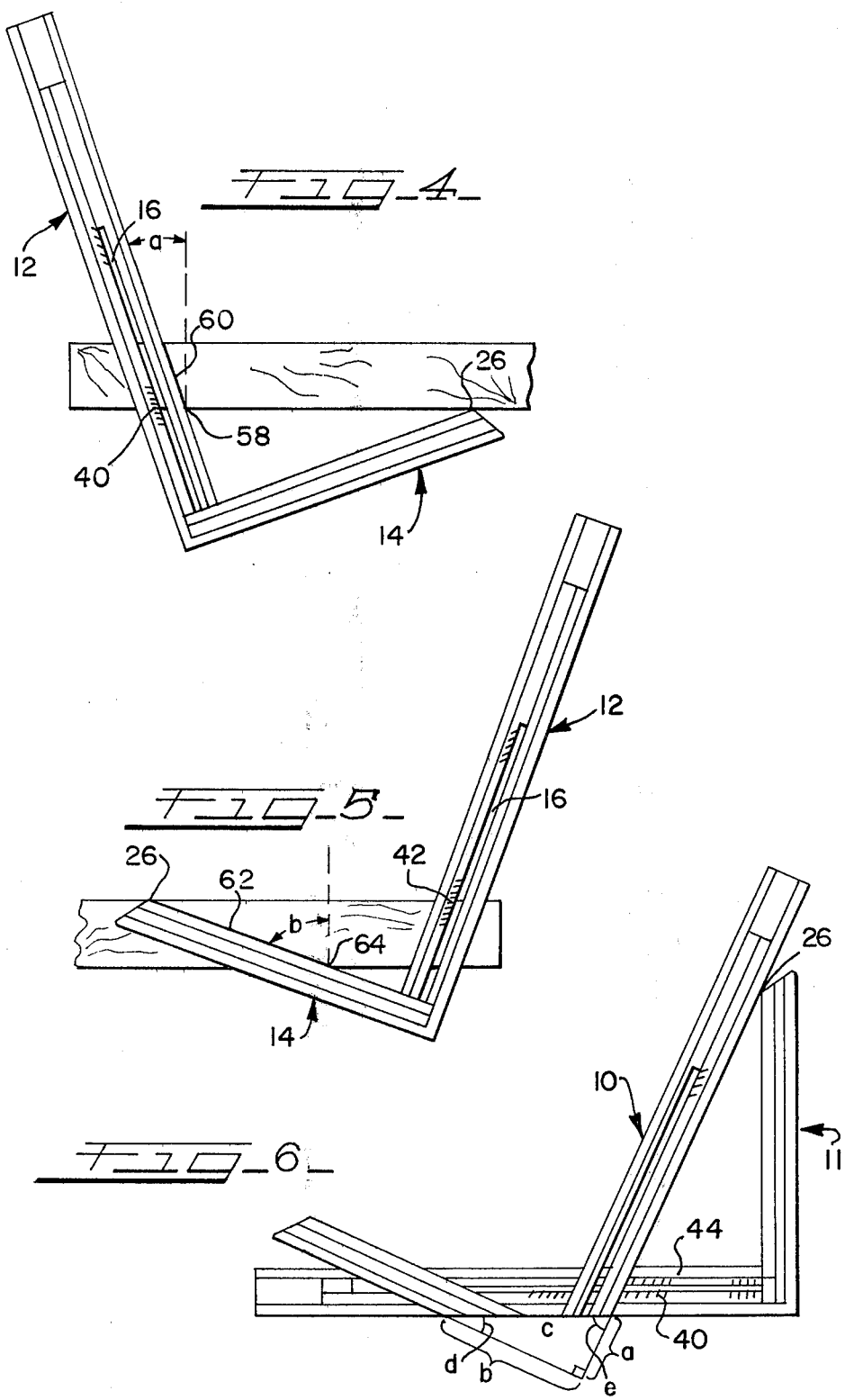

FRAMING AND LAYOUT SQUARE

BACKGROUND OF THE INVENTION

In addition to the standard framing square several other tools have been developed over the years to aid carpenters in framing and layout work although none has exhibited the simplicity and ease of use of the present invention. Among these prior art devices are those disclosed in U.S. Pat. Nos. 854,125, to Thompson; 991,693, to Brown; 1,641,168, to Jacques; 2,026,274, to Doyle; 2,028,052, to Easterly; and 3,456,353, to Iams. These devices are encumbered with many deficiencies such as moving parts which tend to collect dirt (Thompson, Easterly, and Iams), irregular and cumbersome shapes (Brown, Jacques, and Doyle), projections which limit the tool's usefullness (Brown and Jacques), and sharp edges which may harm the work (Brown).

SUMMARY OF THE INVENTION

The present invention is a framing and layout square of flat unitary construction which provides many advantages in clarity and ease of use to craftsmen or relative novices over prior devices such as framing squares and various measuring tools. The square is designed to greatly simplify framing and layout work. It is an improvement over the old-fashioned standard framing square, providing additional features and greater capabilities. The substantially L-shaped square is provided with an elongated blade attached at a right angle to an elongated tongue. The blade defines a slot which provides additional edges for measurement scales. To measure angles, a reference pivot point is provided at an angled terminus of the tongue. Other unique features of the invention are tables and scales permanently marked on both sides of the tool to permit easy and quick conversion of values and measurement of angles, lengths and thicknesses, and graphic instructional material marked on both sides of the tool.

DESCRIPTION OF THE DRAWINGS

FIG. 1 is a plan view of one face of the device.

FIG. 2 is a plan view of the reverse face of the device.

FIG. 3 is an enlarged plan view of a portion of the face of the device shown in FIG. 1.

FIG. 4 shows the device being used to measure angles of less than 45°.

FIG. 5 shows the device being used to measure angles between 45° and 90°.

FIG. 6 shows two of the devices being used to solve a right triangle.

DETAILED DESCRIPTION OF THE PREFERRED EMBODIMENT

Turning now to the drawings, in FIG. 1 is shown one face of the framing and layout square 10 embodying the present invention. As may be seen from this view, the device is of unitary construction, and in this embodiment is fabricated of 11 gauge aluminum alloy with all markings photoengraved and anodized. The main components of framing and layout square 10 are blade 12 and tongue 14. Blade 12 and tongue 14 are disposed at right angles to each other as shown in this and succeeding views. Blade 12 defines an elongated slot 16 located between and parallel to the blade's inside edge 18 and outside edge 20. As shown in this embodiment, blade 12 is twenty-four inches in length and two inches in width. Extending from one end of blade 12 at a right angle thereto is located tongue 14 having parallel longitudinal edges 22 and 24. Edge 22 extends twelve inches from edge 18 of the blade 12 to index point 26. Terminal edge 28 extends from index point 26 to rounded point 30, which is the intersection of terminal edge 28 and the tongue's outside edge 24. Terminal edge 28 is disposed at a forty-five and one-fourth degree angle to outside edge 24. Point 30 is rounded for reasons of safety.

The twenty-four-inch blade may also be described as comprising two parallel blades, outside blade 32 and inside blade 34, both of which terminate in common blade terminal 36 as shown. The width of inside blade 34 is three-fourths inch. This is equal to exactly one-half the thickness of standard framing lumber. This allows the diagonal thickness of the lumber to be measured at any degree or pitch. Slot 16 has a width of five-sixteenths inch, so that the distance from the inward-facing edge of inside blade 34 to the inward-facing edge of outside blade 32 is one and one-sixteenth inches. This is one-half the width of standard framing lumber at a forty-five degree angle. This allows the diagonal thickness of the lumber to be measured at any degree or pitch from a forty-five degree angle.

FIG. 2 shows a plan view of the reverse side of the device shown in FIG. 1. FIG. 3 illustrates, in detail, the measuring scales imprinted on the device. The outside edge 24 of tongue 14 is marked in graduations of inches and twelfths of an inch. Similar markings are found on the outside edge 20 of the blade 12. Inside edges 18 and 22 of blade 12 and tongue 14 are marked in graduations of inches and sixteenths of an inch. This arrangement is reversed on the reverse side of the device, with outside edges of tongue and blade marked in graduations of inches and sixteenths of an inch and inside edges marked with graduations of inches and twelfths of an inch. Graduations marked in twelfths of an inch are usable in framing and layout work to scale down measurements of feet and inches to measurements of inches and twelfths of an inch.

Located on both sides of the device are angle measurement scales located along the edges of elongated slot 16. Outer degree scales 38 and 40 are marked from 0° to 45°. Inner degree scales 42 and 44 are marked from 45° to 90°. Graphic instructional material is provided on both sides of blade terminal 36 to instruct the user in various techniques of utilizing this device, such as angle measurement, radius determination of bends and the solution of right triangle. Also provided on blade terminal 36 are decimal equivalence tables and similar informative material. As best shown in FIG. 3, additional scales are provided on both sides of the tongue 14 at scales 46, 48, 50, 52, 54, and 56 to enable the craftsman to solve various framing problems such as angles of miter and plumb cuts, dimensions of hip and valley rafters per foot run of common rafters, and dimensions of progressive jack rafters.

In use, the device embodying the present invention exhibits several functions made possible by the inclusion of the slotted blade with degree scales and index point 26 at the end of tongue 14. FIGS. 4 and 5 illustrate the use of the device for the measurement of angles on a work-piece. For the measurement and scoring of an angle of less than 45°, the technique illustrated in FIG. 4 is used. The device is situated on the workpiece so that reference point 26 and the intended degree mark on degree scale 40 are aligned with the edge of the workpiece. In this manner, score line 60 can be drawn at point 58 at the intended angle A from the vertical.

For angles measuring more than 45°, but less than 90° from vertical, the technique illustrated in FIG. 5 is used. The device is placed against the workpiece so that index point 26 and the intended degree mark on inner degree scale 42 are aligned with the workpiece as shown. In this manner, score line 62 may be drawn from point 64 on the workpiece at the intended angle B.

FIG. 6 illustrates a technique of using the present invention to solve a right triangle, a problem frequently encountered in framing and layout work. In this instance, two of the devices are used to quickly solve the triangle. In this manner, angle d is read directly from inner degree scale 44 and angle b is read directly from outer degree scale 40. The length of the sides of the triangle may be read directly from the linear measurement scales of squares 10 and 11 as shown.

Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. A framing and layout square of unitary construction comprising a blade and a tongue, each of which have flat upper and lower surfaces, said blade and tongue disposed coplanarly and perpendicularly each to the other, said blade having an interior rectilinear lateral edge and an exterior rectilinear lateral edge, each of which include a linear measurement scale defined thereon, an elongated slot defined in said blade of sufficient width to provide a sight opening for aligning the edge of a piece of lumber, said slot arranged parallel to and disposed between the lateral edges of the blade, said slot including first and second measurement edges disposed at either side thereof, said blade inluding a first angular measurement scale defined along said first edge of said slot graduated from 0° to 45° and a second angular measurement scale defined along said second edge of said slot graduated from 45° to 90°, said first and second angular measurement scales arranged such that they are positioned in reciprocal alignment with each other, said tongue having an interior rectilinear lateral edge, and an exterior rectilinear lateral edge, each of which include a linear measurement scale defined thereon, said tongue also including a terminal edge extending between and joining said exterior and interior edges of said tongue, said edge disposed at an angle of substantially 45° to the exterior lateral edge of the tongue and an index point defined at the intersection of said terminal edge of said tongue and said interior rectilinear edge thereof.

2. A framing and layout square as in claim 1 including a rounded corner defined at the intersection of said terminal edge of said tongue and said exterior rectilinear edge.

3. A framing and layout square as in claim 1 with linear and angular measurement scales and numerical tables marked on both sides of said blade and said tongue.

4. A framing and layout square as in claim 1 wherein said blade is two inches wide.

5. A framing and layout square as in claim 1 wherein said blade is 24 inches long.

6. A framing and layout square as in claim 1 wherein said tongue is 1½ inches wide.

7. A framing and layout square as in clam 1 wherein said interior lateral edge of said tongue is 12 inches long.

8. A framing and layout square as in claim 1 wherein graphic instructional material adapted to aid in the use of the framing and layout square is depicted on at least face thereof.

9. A framing and layout square as in clam 1 wherein said blade is two inches wide and said elongated slot is 5/16 inch wide with an interior edge of said elongated slot located ¾ inch from said blade's interior rectilinear lateral edge.

* * * * *